Sept. 22, 1953     A. E. HEIN ET AL     2,652,790
DOUGH DIVIDER

Filed Dec. 28, 1948                               2 Sheets-Sheet 1

INVENTORS.
August E. Hein,
William H. Klausing,
BY

Harness, Dickey & Pierce
ATTORNEYS.

Sept. 22, 1953        A. E. HEIN ET AL        2,652,790
DOUGH DIVIDER
Filed Dec. 28, 1948        2 Sheets-Sheet 2
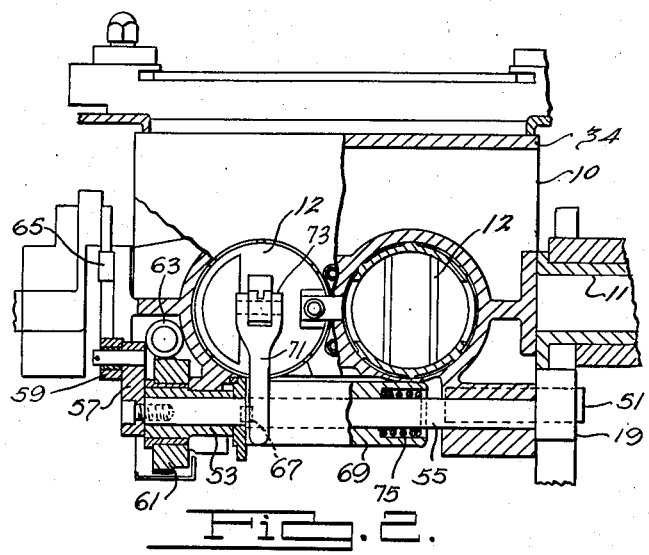
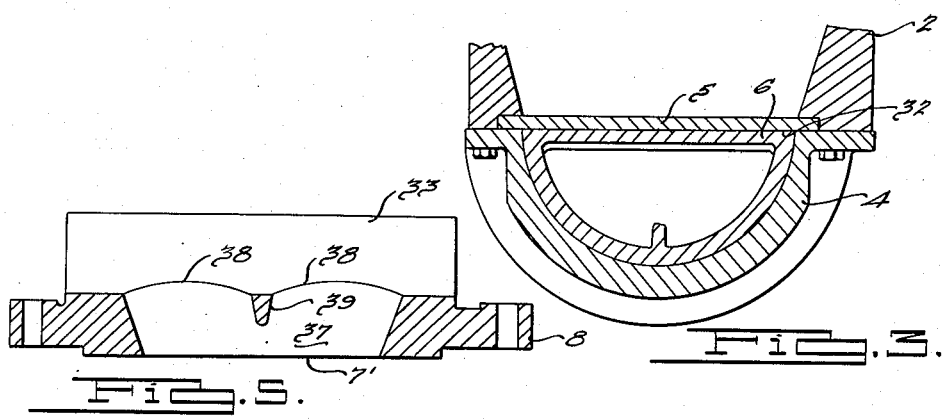
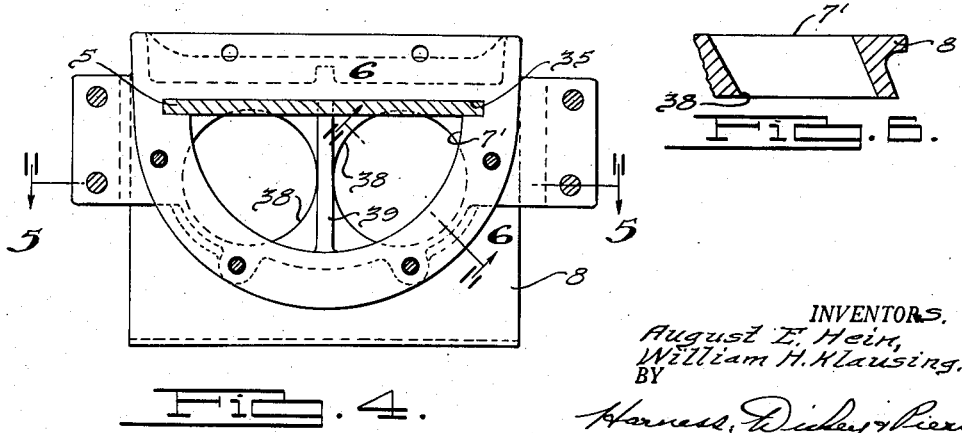
INVENTORS.
August E. Hein,
William H. Klausing.
BY
Harness, Dickey & Pierce
ATTORNEYS.

Patented Sept. 22, 1953

2,652,790

UNITED STATES PATENT OFFICE 2,652,790

DOUGH DIVIDER

August E. Hein and William H. Klausing, Cincinnati, Ohio, assignors to The Century Machine Company, Cincinnati, Ohio, a corporation of Ohio Application December 28, 1948, Serial No. 67,594

7 Claims. (Cl. 107—15)

This invention relates to dough handling apparatus and, in particular, refers to dough dividers for use in bread making and similar processes.

Dough dividing apparatus of the type herein referred to includes an elongated compression or dough box having a reciprocating plunger therein. The box has an inlet opening in one side through which dough from a hopper is fed to the plunger. The plunger forces the dough out of an outlet opening in one end of the box into a measuring head that transfers predetermined quantities of dough to desired means such as a conveyor belt.

In the past considerable difficulty has been experienced in filling the dough box by dough flow from the hopper. Gravity as well as the effect of suction in the box have, in the past, been depended upon to fill the box. Invariably, however, complete filling is not obtained and air pockets are found in the dough.

High compression pressures are employed in an attempt to reduce the pockets, expel the entrapped air, and render the dough uniform. Such pressures do not successfully accomplish these objects and the dough is still inaccurately scaled. Those in the art dislike the use of high pressures since it subjects the dough to severe punishment which is likely to kill or fell it. Multiple compression of the dough is, in particular, avoided and dividers are designed so that no more dough than is necessary for a light cushion remains in the ram chamber at the end of the compression or explusion stroke.

In the present invention, a dough box is provided which may be completely filled by gravity flow without the formation of air pockets. There are two important advantages attendant upon the use of this construction. First, the rate of production of a divider having such a box can be greatly increased since it is not necessary to delay the compression stroke while the viscous dough is attempting to flow into the more remote corners of the dough box. Second, the compression pressures may be markedly reduced since there are no large air pockets to be eliminated. This reduction in pressure enables dough dividers incorporating the improved dough box to be operated upon a principle which is contra to the teachings of the art, i. e., multiple compression. Operation upon the principle of multiple compression makes it possible to still further reduce the compression pressures since an increased number of workings of the dough at a lower pressure can accomplish more than all the beneficial results that may be obtained upon a single working at a higher pressure. Not only is there virtually no danger of felling the dough but the product obtained is much more uniform and very accurately scaled.

In addition to the improved dough box construction, the invention also provides means coactive therewith for feeding a plurality of pockets in the measuring head so that a number of individual dough pieces may be formed on each compression stroke of the dough plunger.

The features of construction for accomplishing these improved results are shown by way of illustration in a preferred form of dough divider in the accompanying drawings in which:

Fig. 2 is a side elevation taken from the right of Fig. 1 with parts in section and parts removed;

Fig. 3 is a cross section taken on line 3—3 of Fig. 1;

Fig. 4 is a cross section taken on line 4—4 of Fig. 1;

Fig. 5 is a cross section taken on line 5—5 of Fig. 4; and

Fig. 6 is a cross section taken on line 6—6 of Fig. 4.

Figure 1:
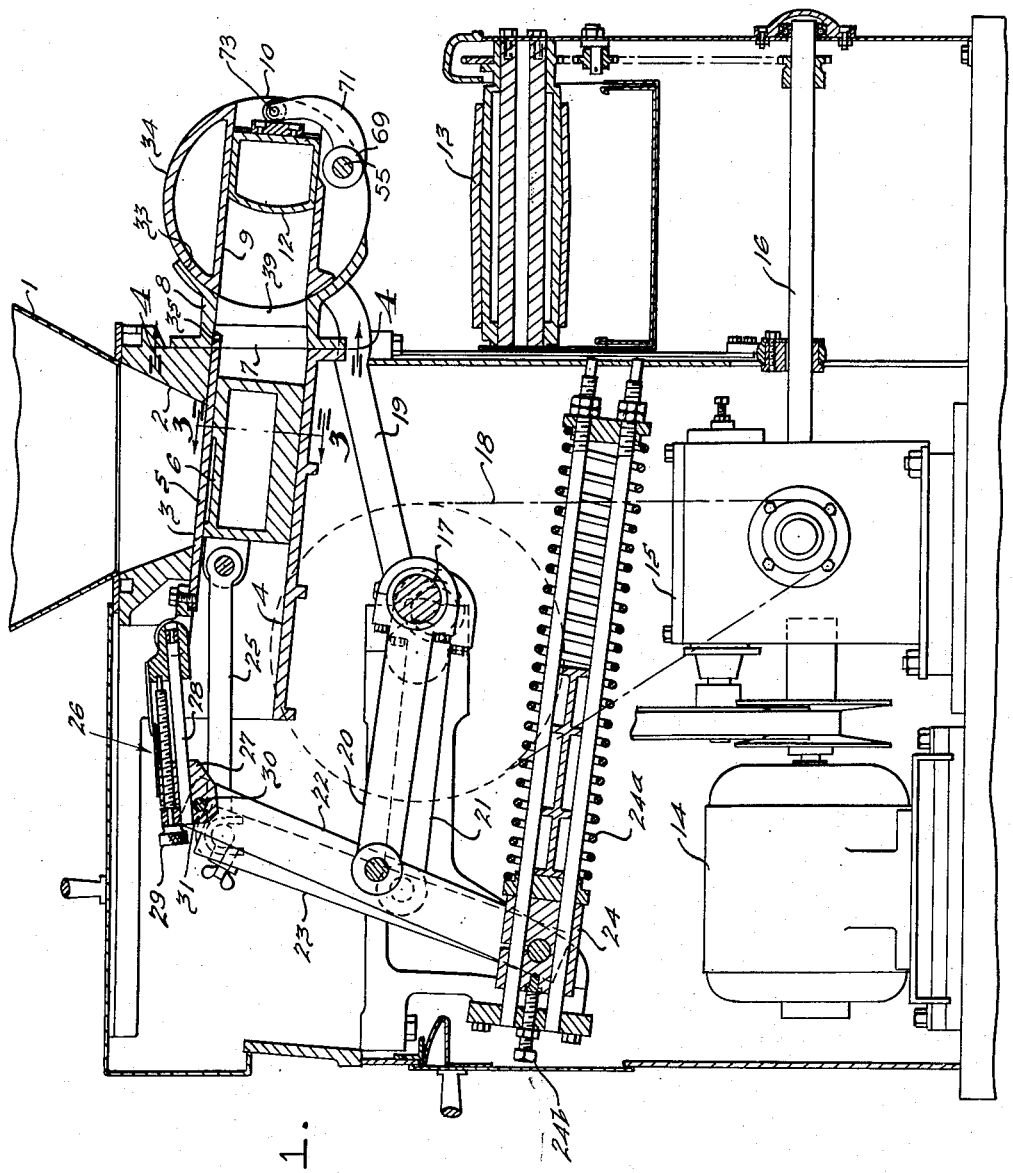
Figure 1 is a vertical section through the improved dough divider.

The improved dough divider shown in Fig. 1 has a hopper 1 and a dough box plate 2 forming an extension of the hopper which hold and feed dough through the outlet 3 to the elongated dough box 4 which has lateral flanges (Fig. 3) that are bolted to the underside of the plate 2. Passage of dough through the outlet 3 is regulated by a reciprocatory knife 5 which fits between the bottom of the plate 2 and the upper surface of a dough plunger 6 which is slidably mounted in the box 4. The plunger 6 compresses dough in the box 4 and forces it to flow through the end outlet 7 of the box into a dividing head 8 which is in pressure tight engagement therewith. As will be described hereinafter, the head 8 has a plurality of outlets through which the dough flows into a corresponding plurality of chambers 9 in the measuring head 10. In accordance with conventional practice the measuring head 10 may be rotatably mounted on the trunnions 11 on fixed side frames of the apparatus for reverse rotation and be provided in the bores 9 with pistons 12 which serve to force the dough pieces from the head when the head is rotated so that the bores 9 open downwardly toward the underlying conveyor belt 13.

The foregoing movable elements may be actuated by a motor 14 acting through a suitable speed reducer 15. The conveyor may be directly connected to the reducer 15 as by a sprocket drive from the driven shaft 16 of the speed reducer but the remaining devices are preferably connected by means of suitable connecting rods to various throws of the crankshaft 17 which is driven by the reducer through the belt 18. One of these rods is the connecting rod 19 which is mounted on a throw of crankshaft 17 and used to rotate the measuring head 10 and reciprocate the pistons 12 to eject dough from the measuring head. The upper end of the rod 19 is pinned at 51 (Fig. 2) to an off-center part of the head 12 so that movement of the rod causes the head to swing about the trunnions 11. In order to reciprocate the pistons 12, the head 10 carries a bushing 53 mounted on cross shaft 55. Fixed to the end of the bushing is a crank arm 57 with a roller 59. The angular position of the crank arm 57 is determined by abutment with an ear (not shown) on worm wheel 61 which is rotatably mounted on the shaft. The angular position of the wheel 61 is manually controlled through worm 63 and this determines the position of the pistons 12 during loading and thus the weight of the dough pieces. When the head 10 is rotated by rod 19, it carries these parts and the roller 59 will strike a fixed stop 65 thus causing the arm 57 and bushing 53 to rock or rotate with respect to the head 10. This movement is transmitted through a dog clutch arrangement 67 to rocker member 69 that is mounted on shaft 55. The member 69 has lever arms 71 that are connected at 73 to the ends of the pistons 12 to move them when it is rocked. The dog clutch 67 is yieldably held in engagement by spring 75 which may be compressed manually to disconnect the arms 71 and pistons 12 from the rest of the mechanism so that the pistons and cylinder may be easily cleaned.

The knife 5 and plunger 6 are connected to the crankshaft 17 through a rod and linkage mechanism which permits adjustment of their relative motion and thus enables control to be exercised over working of the dough so that uniformity may be obtained among various size dough pieces. This mechanism includes connecting rods 20 and 21 for the knife and plunger, respectively, the knife rod 20 being attached to a crankshaft throw which is slightly in advance and of greater radius than the throw to which the plunger rod 21 is attached. The rods 20 and 21 are pivoted to central sections of the floating links 22 and 23 which in turn are pivoted at their lower ends to a spring-loaded adjustable block 24 that is slidable upon a pair of rods that depend from a headpiece affixed to the frame of the apparatus, the setting of the compression spring 24a being regulated by the adjusting screw 24b which bears upon the block 24 to limit spring expansion. A link 25 pivotally connects the link 23 to the back of the plunger 6. A lost motion connection 26 connects the knife link 22 to the back of the knife 5. In the connection 26 a block 27 is slidably and adjustably mounted on the rod 28, which is pivoted to the knife, under the control of an adjusting screw 29 that threads through the block 27 and is rotatably supported in the pivot at the rear of the knife 5. The pivot pin 30 of the knife link 22 engages the block 27 to drive the knife 5 forward, and engages a block 31 which is fixed on the rod 28 to return the knife. Thus, when the space between the blocks 27 and 31 is adjusted by turning of screw 29 to be greater than the diameter of pin 30, there is a delay in forward movement of the knife until the pin moves through the excess distance to contact the block 27. Thus, by control of the space between the blocks 27 and 31, through the medium of screw 29, it is possible to vary the cutoff point, i. e., the position of the plunger 6 when the knife 5 has completely closed the outlet 3.

In accordance with the present invention, the dough box 4 is internally formed to a shape typified by that shown in Fig. 3. Thus, it is provided with an open top 32 which forms an inlet for dough flowing through the hopper outlet 3 when the knife 5 is retracted. The sides of the box 4 converge inwardly from the inlet 32 so that the inlet defines an opening of maximum box width. These requirements are most conveniently met by forming the box 4 in the semi-cylindrical shape shown wherein the top opening 32 lies on a diameter or a chord of maximum length.

In constructions heretofore known, suction in the dough box has been depended upon to completely fill it. Invariably, however, this has not been sufficient and the dough did not flow into the more remote corners. Hence, upon subsequent compression by the plunger, the pressures required were high but, nonetheless, voids and air pockets were present in the dough resulting in inaccurate scaling. In the present construction, however, the shape of the dough box 4 conforms generally to the substantially tear drop shape of the dough leaving the hopper. Suction is, therefore, not required to change the natural flow path of the dough so as to fill remote corners of the box. As a consequence, the present dough box produces very uniform dough pieces and lower compression pressures can be employed.

The plunger 6 which works in the dough box 5 is, of course, fitted thereto and thus in the present case is also of semi-cylindrical shape. As those in the art will recognize from the drawings, the plunger 6 may be formed by foundry methods. The plunger 6 forces the dough to flow through the semi-circular end outlet 7 of the box 4, applying a maximum pressure that is regulated by the resistance of the spring loaded block 24, into the dividing head or dough box front 8. In order to obtain the hereinbefore mentioned benefits of multiple compression, the length of the dough box front and the length of the stroke of the plunger 6 (the latter being governed by the setting of spring 24a), are preferably interrelated so that the combined volumes of the front and box at the beginning of the stroke are more than twice that of the volume of dough expelled on each compression stroke. With this arrangement there is always a reserve of dough in the front 8 which receives at least two, and preferably three, i. e., multiple compressions. This helps to distribute and expel any excessive gas pockets which might be formed and is a still further aid to accurate and uniform scaling. It has already been indicated that the dough box shape permits a reduction of pressure and with this multiple compression feature, the actual pressure employed can be reduced still further thereby considerably reducing the punishment received by the dough and eliminating the danger of killing or felling the dough.

The dough box and plunger are capable of discharging dough pieces on each stroke which are considerably larger than those ordinarily desired. In order to obtain a high rate of production, it is necessary to divide the dough lump passing outlet 7 into a predetermined number of smaller pieces of suitable weight and volume.

This could be accomplished by the measuring head 10, but nonuniformities would result due to the dough striking the surface of the head between the bores 9. Hence, it is desirable to use an adapter head between the dough box outlet 7 and the measuring head 10 and in the present case this comprises the dough box front or dividing head 8 which is best shown in Figs. 4–6. The front is tightly secured to the outlet end of the dough box so as to form in effect an extension thereof. Inasmuch as a rotary rather than reciprocatory measuring head is illustrated, the outlet side 33 of the front 8 is rounded and forms a partially cylindrical bearing surface for the rotary measuring head 10. The head 10, in conventional form, has a rounded solid upper wall 34 which engages the side 33 to prevent egress of dough when the head is rotated to the downward discharge position.

The front 8 is constructed to apply plunger pressure only on the pistons 12 in the measuring head bores 9. It is also constructed so that there is substantially no extrusion of the dough as it passes from the larger outlet 7 to the bores 9. For these purposes, the inlet 7' (Figs. 5 and 6) of the front 8 is of the same size and shape as the outlet 7 of the dough box 4, it being considered that the tip 35 of the knife 5 in its extreme position of Figs. 1 and 4 is in effect a part of the front 8 which may be slotted at 36 to receive it. As shown in Figs. 5 and 6, the inlet 7' opens into the dough front chamber 37 which has downwardly and outwardly sloping walls and a pair of outlets 38 opening into the outlet side 33. An upright and forwardly extending dividing plate 39 is formed in the front and is positioned in the chamber 37 between the outlets 38. This serves to sever the dough flowing through inlet 7' and direct it into paths leading to the outlets. The outlets 38 are coextensive with and preferably the same size as the bores 9 so that pressure is applied only to the pistons 12. The combined areas of the outlets 38 are preferably about equal to the area of the inlet 7', hence no substantial extruding of the dough occurs as it passes through the front 8.

It will now be recognized that by virtue of the improvements hereindescribed the dough divider illustrated is capable of producing more uniform and accurately scaled dough pieces than heretofore available and at a high rate of production. It will further be realized that invention may be employed in modified forms hence it is not intended to limit it to the specific details shown herein by way of illustration.

What is claimed is:

1. In a dough divider, an elongated dough box having a dough receiving inlet and sides converging inwardly toward each other from the edges of the inlet, said inlet defining an opening extending across the maximum width of said box, said sides being curved in cross section and joining each other to form a continuous curved wall, and a dough plunger of substantially the same cross sectional shape as the box mounted therein for longitudinal reciprocation and adapted to open and close said inlet and to compress dough confined in the box.

2. In a dough divider, a dough box comprising a cylindrical segment having the chord side thereof open to provide a dough receiving inlet, the edges of said inlet defining an opening extending across the maximum width of the box, and a dough plunger of substantially the same cross sectional shape as the box mounted therein for longitudinal reciprocation and adapted to open and close said inlet and to compress dough confined in the box.

3. In a dough divider, a dough box comprising a semi-cylindrical segment having the diametrical side open to provide a dough receiving inlet, and a semi-cylindrical dough plunger fitted in the box for longitudinal reciprocation and adapted to open and close said inlet and to compress dough confined in the box.

4. In a dough divider, an elongated dough box having a dough receiving inlet and sides converging inwardly toward each other from the edges of the inlet whereby said inlet edges define an inlet opening extending across the maximum width of the box cross section and joining each other to form a continuous curved wall, and a dough plunger of substantially the same cross sectional shape as the box mounted therein for longitudinal reciprocation and adapted to open and close said inlet and to compress dough confined in the box, said box having an open outlet end, an adapter head in pressure-tight engagement with the outlet end of the box to receive dough flowing therethrough, and a measuring head having a pair of cylinders arranged to receive dough from the adapter head, said adapter head being provided with a central knife edge divider for severing the dough flowing therethrough and directing it into predetermined paths, said adapter head having a plurality of outlets in line with said cylinders and similar in size and shape thereto and separated from each other by the knife edge divider in said adapter.

5. In a dough divider, the combination of an elongated dough box having a dough receiving inlet and sides converging inwardly from the edges of the inlet, said edges defining an opening extending across the maximum width of the box, said box having an outlet at one end, a dough plunger for compressing dough in the box and forcing it through the outlet, means for adjusting the stroke of said plunger, said means and the length of said box being related so that at the end of the compression stroke the box contains at least as much dough between the plunger and outlet as is expelled by the compression stroke whereby all the dough receives a plurality of compressions.

6. In a dough divider, the combination of a dough box formed by a cylindrical segment having the chord side thereof open to provide a dough receiving inlet, said chord side defining an opening extending across the maximum width of said box, one end of the segment being open to form a segmental outlet opening for compressed dough, a segmental dough plunger of substantially the same size as the box mounted therein for longitudinal reciprocation and adapted to open and close the inlet and to force dough through said outlet, an adapter head in pressure-tight engagement with the end of the box having a segmental inlet forming an extension of the box outlet and a chamber in rectilinear flow communication with said segmental inlet, flow dividing means in the chamber for separating dough flow into a plurality of paths, said head having an outlet for each of the paths, a measuring head having cylinders receiving dough from said adapter outlets, said cylinders and adapter outlets being of similar size and shape and the total area of the adapter outlets being substantially equal to that of the segmental outlet.

7. The invention set forth in claim 4 including means for reciprocating said dough plunger between forward and retracted position adjacent to and remote from said adapter head, said means being arranged so that at the end of the forward stroke of the plunger the box and adapter head contain at least as much dough between the plunger and the measuring head as is contained in the box space located between the forward and retracted positions of said plunger whereby all the dough receives a plurality of compressions.

AUGUST E. HEIN.
WILLIAM H. KLAUSING.

References Cited in the file of this patent

UNITED STATES PATENTS

| Number | Name | Date |
|---|---|---|
| 836,777 | Parsons et al. | Nov. 27, 1906 |
| 871,648 | Streich | Nov. 19, 1907 |
| 873,682 | Pendrith | Dec. 10, 1907 |
| 1,363,614 | Pointon | Dec. 28, 1920 |
| 1,704,903 | Russell | Mar. 12, 1929 |
| 1,960,435 | Dudley | May 29, 1934 |